United States Patent
Wheals (10) Patent No.: US 7,390,284 B2
(45) Date of Patent: Jun. 24, 2008

(54) VEHICLE TRANSMISSION SHIFT QUALITY

(75) Inventor: Jonathan Charles Wheals, Loughborough (GB)

(73) Assignee: Ricardo UK Limited, West Sussex (GB)

( * ) Notice: Subject to any disclaimer, the term of this patent is extended or adjusted under 35 U.S.C. 154(b) by 0 days.

(21) Appl. No.: 10/477,245

(22) PCT Filed: May 13, 2002

(86) PCT No.: PCT/GB02/02212

§ 371 (c)(1),
(2), (4) Date: Jul. 12, 2004

(87) PCT Pub. No.: WO02/092379

PCT Pub. Date: Nov. 21, 2002

(65) Prior Publication Data
US 2004/0242374 A1    Dec. 2, 2004

(30) Foreign Application Priority Data

May 11, 2001 (GB) .................................. 0111582.3
Mar. 4, 2002 (GB) .................................. 0205006.0

(51) Int. Cl.
*G60W 10/04* (2006.01)
*F16H 59/60* (2006.01)
*G06F 7/00* (2006.01)

(52) U.S. Cl. .............................. 477/115; 477/97; 701/59

(58) Field of Classification Search ................. 477/97, 477/115, 120, 902; 701/55, 58, 59, 60; 180/272
See application file for complete search history.

(56) References Cited

U.S. PATENT DOCUMENTS

| | | | | |
|---|---|---|---|---|
| 5,099,428 A | * | 3/1992 | Takahashi | 701/59 |
| 5,285,523 A | * | 2/1994 | Takahashi | 706/20 |
| 5,611,753 A | * | 3/1997 | Kondo et al. | 477/118 |
| 5,667,044 A | * | 9/1997 | Choi | 74/335 |
| 5,835,875 A | * | 11/1998 | Kirchhoffer et al. | 701/51 |
| 5,931,886 A | * | 8/1999 | Moroto et al. | 701/54 |
| 5,951,615 A | * | 9/1999 | Malson | 701/57 |
| 6,079,258 A | | 6/2000 | List et al. | 73/117.3 |
| 6,259,983 B1 | * | 7/2001 | Tsutsui et al. | 701/51 |
| 6,411,880 B1 | * | 6/2002 | McKee et al. | 701/55 |
| 6,577,939 B1 | * | 6/2003 | Keyse et al. | 701/55 |
| 7,243,945 B2 | * | 7/2007 | Breed et al. | 280/735 |
| 2002/0049118 A1 | | 4/2002 | Vornehm et al. | |
| 2004/0014564 A1 | * | 1/2004 | Jager et al. | 477/115 |

FOREIGN PATENT DOCUMENTS

| | | |
|---|---|---|
| DE | 199 54 552 A1 | 5/2000 |
| GB | 2294302 | 4/1996 |
| WO | WO 97/48923 | 12/1997 |

OTHER PUBLICATIONS

English translation of DE 19954552A1 vis EPO.*

* cited by examiner

*Primary Examiner*—Roger Pang
(74) *Attorney, Agent, or Firm*—Osha Liang, LLP (57) ABSTRACT

A vehicle powertrain modelling system includes a powertrain model (20), a vehicle model (30), a seat model (55), a driver model (60) and a correlation element (50) comprising a neural network. As a result vehicle development is enhanced, using the neural network (50) to correlate modelled shift aspects with previous subjectively obtained ratings.

11 Claims, 8 Drawing Sheets

Test Vehicle for Variable Shift Profiles

VEHICLE TRANSMISSION SHIFT QUALITY

The invention relates to vehicle transmission shift quality, in particular in relation to automated manual transmission (AMT) shift quality.

In Europe there is considerable growth in the application of automated manual transmissions (AMT) predominantly for reasons of cost and $CO_2$ efficiency. There are a range of such transmissions available, and they can generally be grouped into single clutch systems (AMT-1) and twin path systems (AMT-2). Yet more sophisticated versions are under development. However, the poor shift quality of this "first wave" of manual-based transmissions, that is to say, the performance of the vehicle during gear changes, particularly as perceived by the driver is a significant problem, due to interruption of the propulsive torque. This differs from conventional planetary automatic transmissions in which the propulsive torque remains positive throughout the shift process.

Figure 1:
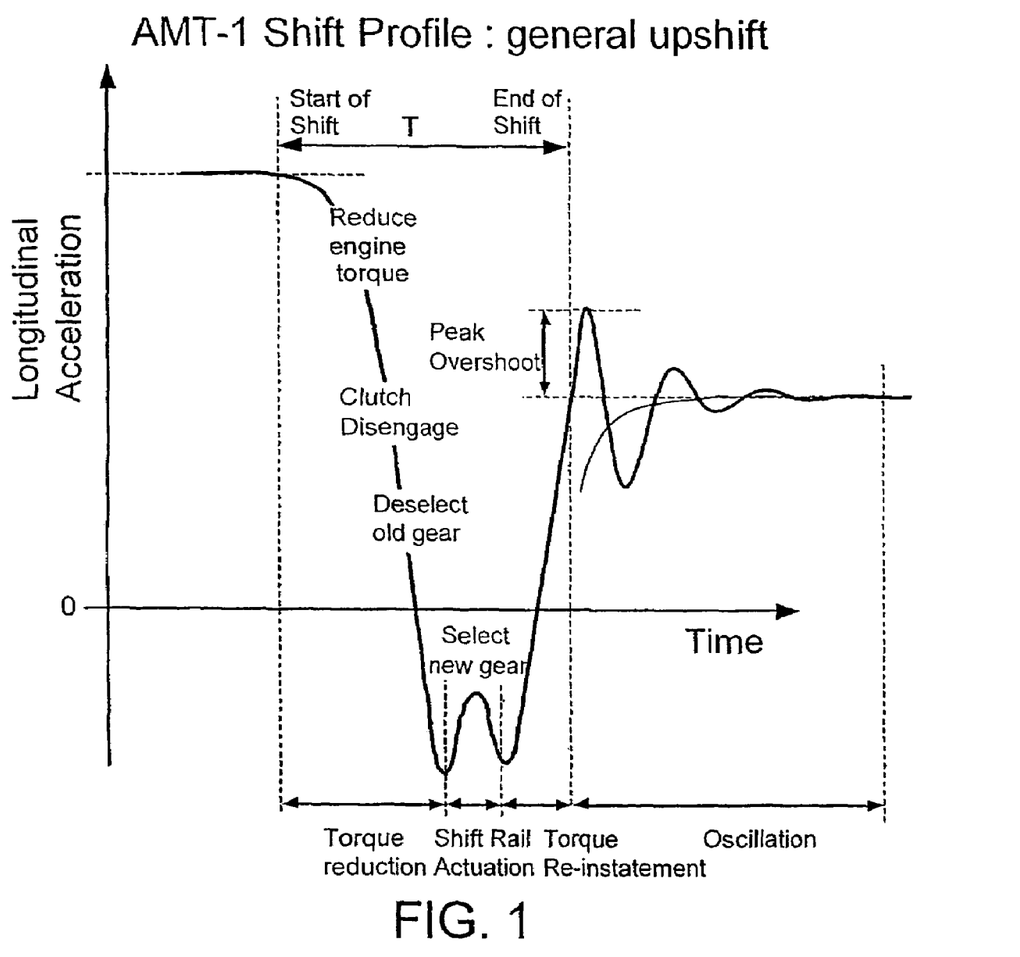
FIG. 1 shows an AMT shift profile.

FIG. 1 shows a typical AMT shift profile (acceleration against time) from which it can be seen that the shift takes a long time and is followed by a period of oscillation.

Various attempts have been made to assess AMT shift quality but these have tended to be inappropriately based on corresponding tests for automatic transmissions, which have significantly different considerations and indeed expectations, or based on simplistic metrics.

The invention is set out in the claims.

The invention gives rise to various advantages over known arrangements. The modelling of the various aspects of the vehicle powertrain or transmission, including a driver model, allows a full and meaningful set of data to be obtained relevant to the shift quality and taking into account, for example, the effects on the driver. As a result the development process can be significantly focused and enhanced as a result of the more advanced metrics adopted. It will be appreciated that references to AMT transmissions extends to alternative stepped transmissions such as automated stepped ratio transmissions and other appropriate transmissions. The invention is also applicable to other transient vehicle phenomena for which object/subjective correlation is relevant.

Embodiments of the invention will now be described, by way of example, with reference to the drawings, of which.

In overview the invention provides an improved approach to measurement, modelling and control of shift quality in AMTs. This is based on a more detailed analysis of the factors affecting the quality of the shift both physically and in terms of driver perception. As a result the invention provides an assessment of the subjective shift quality obtained from measured or predicted time-based data. In addition the system can be used to define cause/effect maps which direct changes to the control variables in an off-line environment. In addition, in on-line operation the cause/effect maps can direct changes within the control algorithms. Yet further the system is used to predict shift quality and flag a diagnostic for service remedy if a given threshold is exceeded.

Analysis of shift quality requires many factors to be considered in combination including: longitudinal acceleration, vehicle pitch and acoustic frequencies and time derivatives of these factors.

In each case the technique must account for two key requirements: identification of features of the shift which allow ready mathematical description of a recorded or predicted shift profile, and a means of correlation which accounts for the inevitable interactions between the sensory inputs to the driver in the formulation of opinion.

Figure 2:
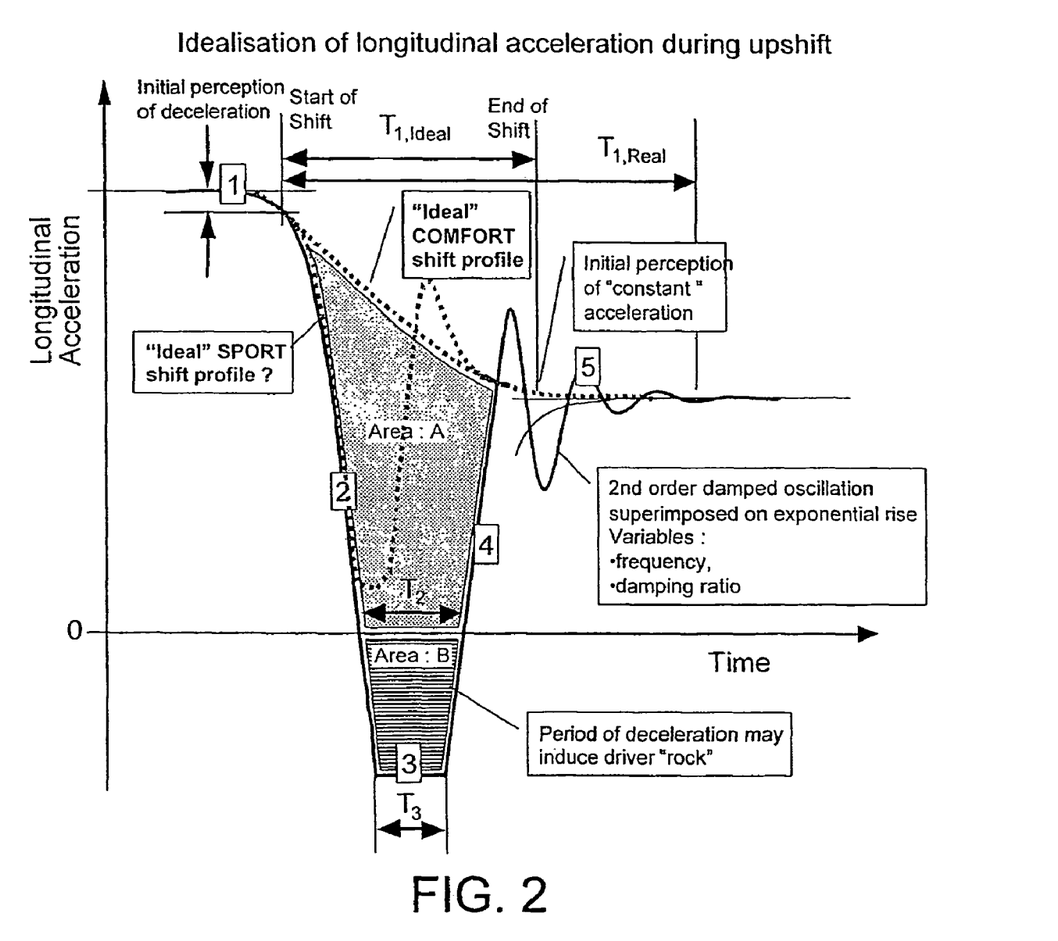
FIG. 2 shows further analysis of the profile.

FIG. 2 shows in more detail the acceleration/time curve for an AMT shift (solid line) together with an "ideal" profile (dotted line). Other "ideal" profiles may be more appropriate for different driving styles. FIG. 2 further illustrates the times T1_Ideal and T1_Real for the ideal and real (oscillatory) shifts based on engineering judgement.

According to a first approach any deviation from this ideal shift can be assigned a mathematical "cost" which would act to reduce the ideal rating from a value of 10. The shift profile is idealised by piece-wise approximations using the following line portions:

Line 1: linear
Line 2: exponential decay
Line 3: linear
Line 4: exponential rise
Line 5: second order damped oscillation superimposed upon an exponential rise Alternative piece-wise elements may also be considered according to the nature of the metric: sports or a comfort shift as shown in FIG. 2.

A cost function comprises weighted factors associated with the magnitude of the deviation from the "ideal" shift for each of the line portions. Additionally, factors relating to the areas marked as area A and B are also included. The units of these areas is velocity ($m.s^{-2} \times time$), therefore the smaller the combined area (A+B), the smaller the loss of associated quantities such as kinetic energy and momentum. Area B would have a higher weighting than area A since if sustained it would relate to a potential condition in which the driver rocked in the seat due to the change in sign of acceleration.

The damping ratio of the oscillatory line portion 5 is taken as a measure of cost for the final portion of the shift.

Figure 10:
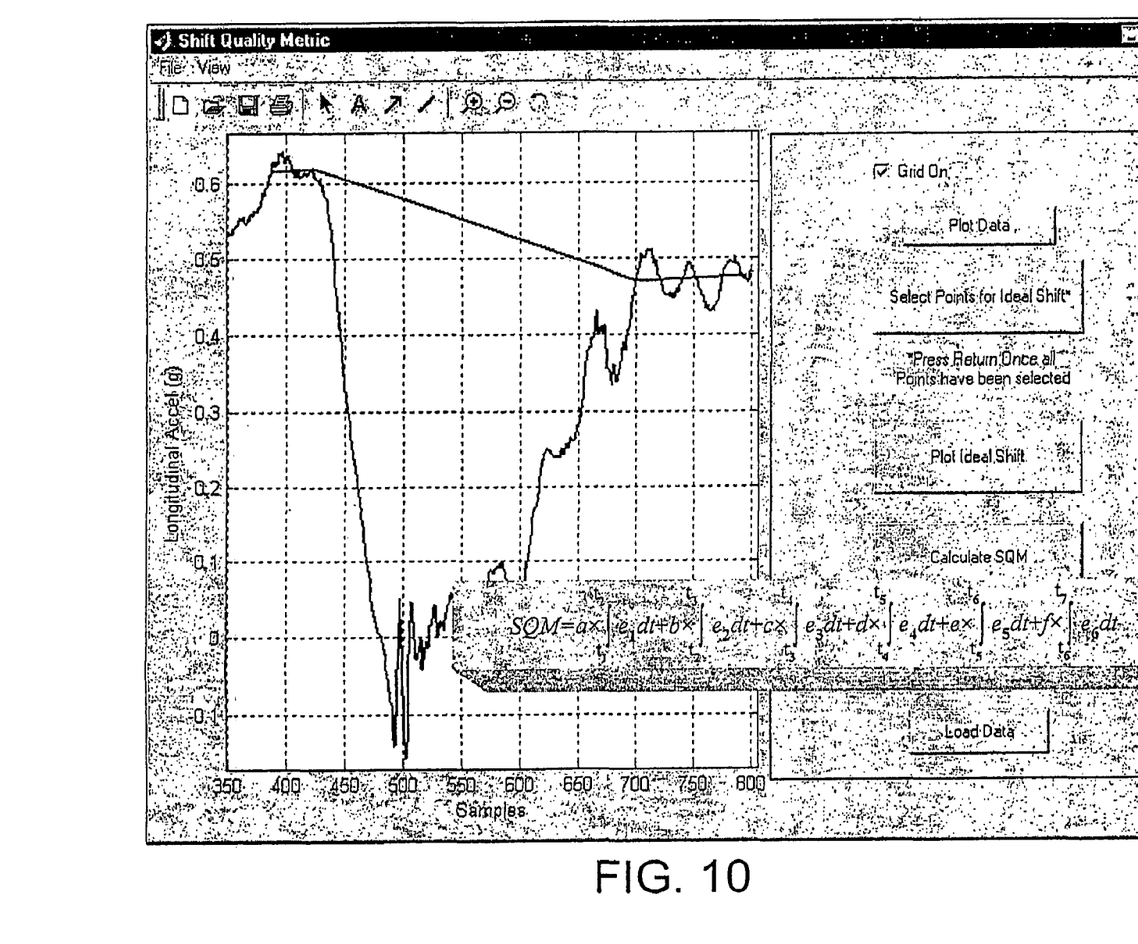
FIG. 10 shows a summation method according to the invention.

Referring to FIG. 10, a cost measurement process can be seen in simplified form where the cost is derived from integrating the elements between the measured and ideal shift curves.

Figure 11:
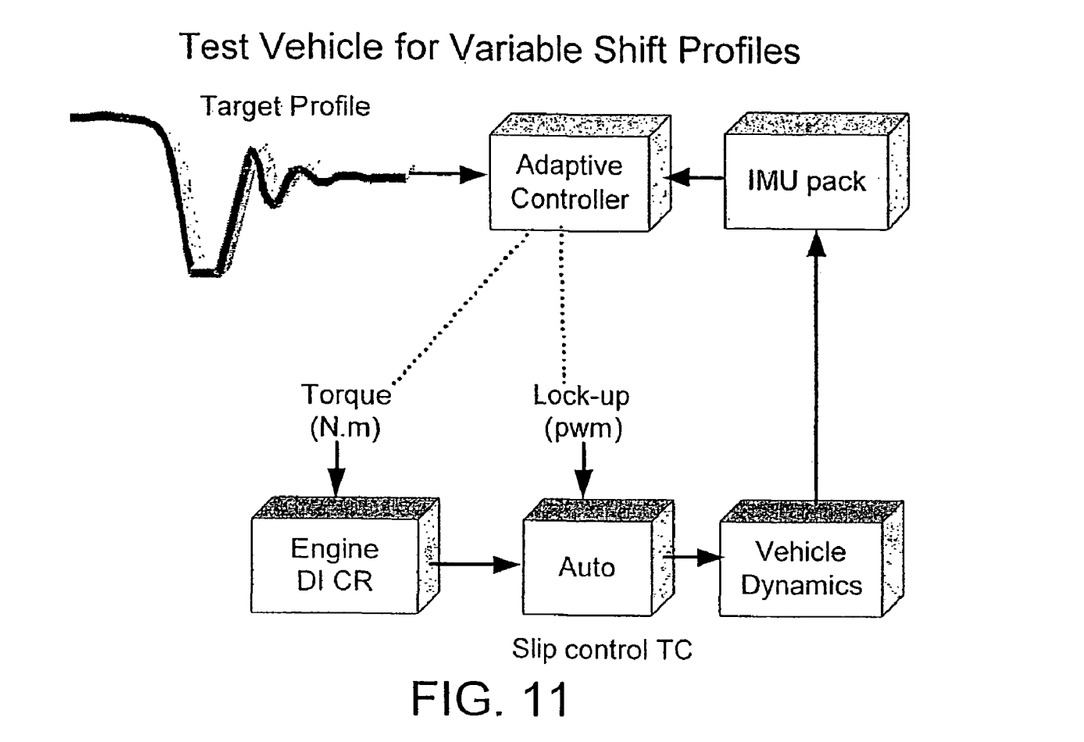
FIG. 11 shows a technique for controlling a parameter such as longitudinal acceleration of the vehicle to specific profiles.
Figure 12:
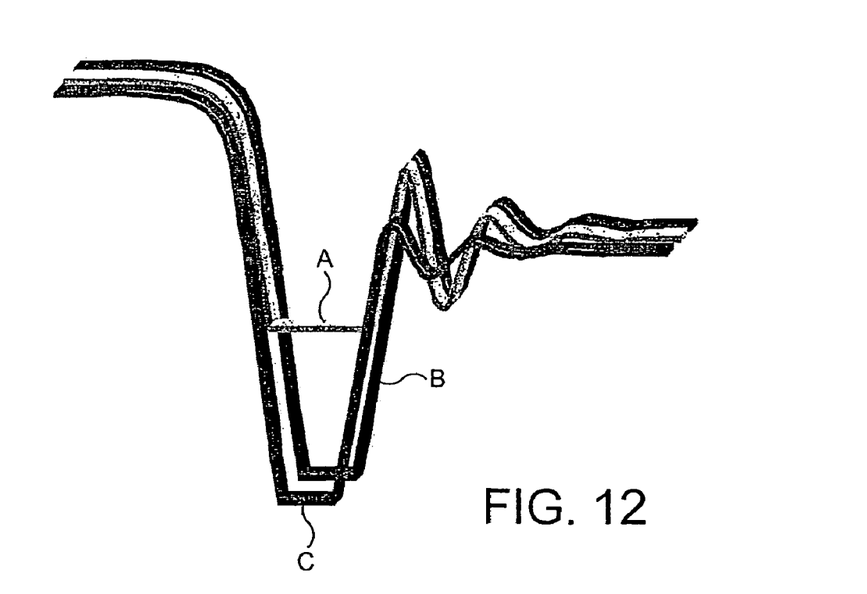
FIG. 12 shows a range of shift profile relating to longitudinal acceleration.

As can be seen from FIGS. 11 and 12 the goal is to vary the real curve to approximate a desired curve which itself is generated from analysis of "preferred" shift quality for example modelled as discussed in more detail below. A suitable approach, therefore, is to define a range of shift profiles for example by generating in-vehicle shift profiles by torque modulation without gear change. As can be seen from FIG. 12 this can generate, for example, curves A, B and C, of which curve A is the preferred profile. By assessing the shift parameters contributing to the different profile, a control strategy can be developed to obtain the preferred profile by a cost reduction approach, using the summation method described above.

Figure 3:
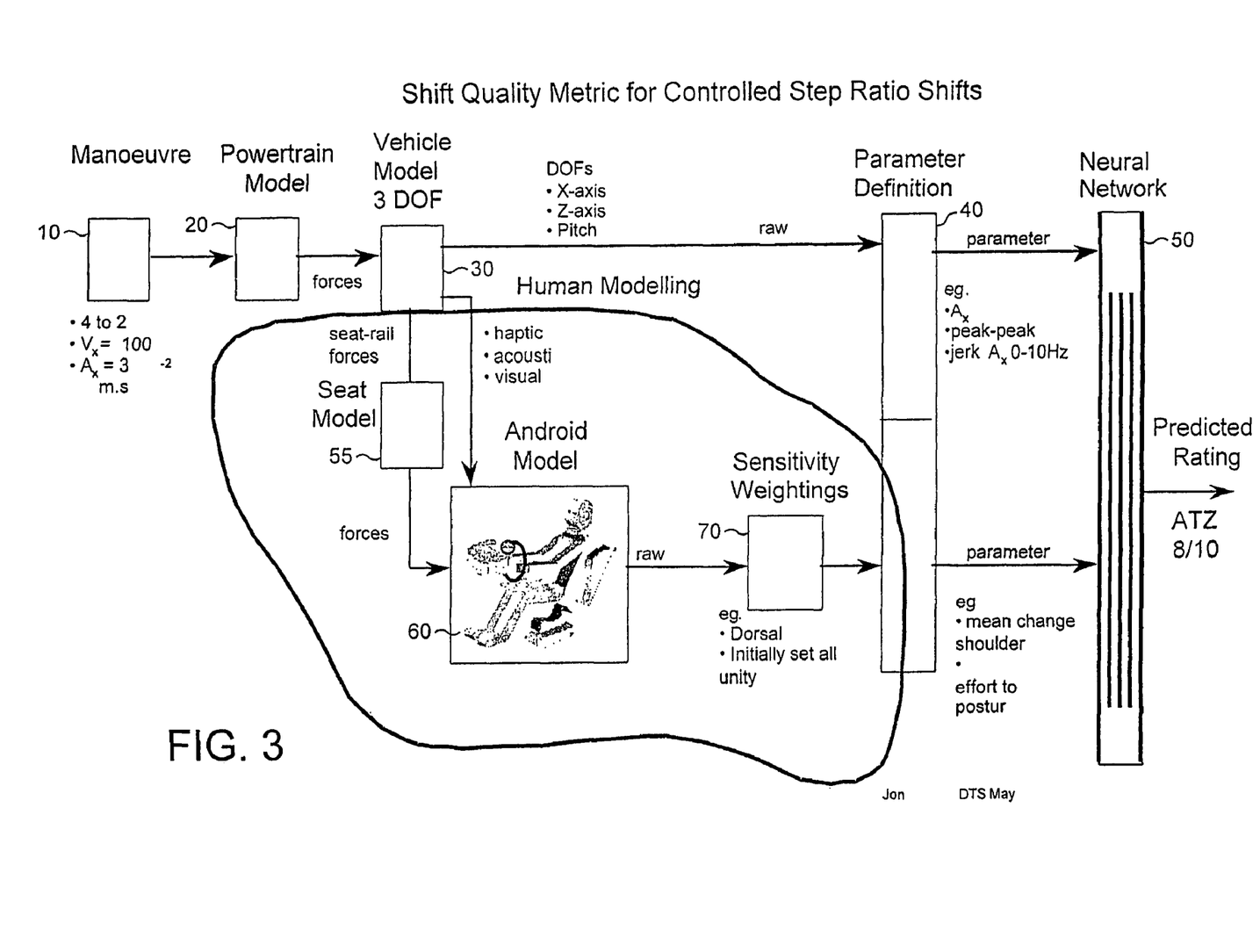
FIG. 3 shows a schematic of a technique for objective/subjective correlation for AMTs.

An alternative or additional approach is illustrated by the overall correction scheme shown in FIG. 3. Block 10 designates the manoeuvre involved, identifying the particular shift (eg fourth gear to second gear), the vehicle speed (eg 100 kp/h) and the longitudinal acceleration (eg 3 m/s/s). As the shift quality will be highly dependent on the particular manoeuvre, it is vital to obtain this information which can be done, for example, by appropriate sensors or via the Engine Control Unit (ECU). Block 20 comprises the powertrain model, comprising the vehicle powertrain factors affecting the shift quality. These comprise in the present embodiment engine torque, engine speed, control of clutch(es), control of transmission engagement actuators, control of relevant aspects of chassis (active dampers to control pitch, active driver seat ergonomics), all of which may again be monitored by appropriate sensors.

In the modelling stage, block 30 represents a vehicle model of any appropriate type representing the dynamics/physical characteristics of the vehicle. In the present embodiment the model 30 has 3 degrees of freedom, X-axis, Z-axis and pitch.

The raw variables affecting shift quality are fed to parameter definition block 40 which converts the data to data representative of shift quality (for example mean acceleration, peak to peak jerk, and a Fast Fourier Transform of the acceleration in the range 0-10 Hz). In order to asses the quality of the shift a correlation is made with a predicted rating (using for example a rating of 1—very bad to 10—very good) based on a subjective rating made by an experienced vehicle tested carrying out the manoeuvre. Any appropriate subjective rating scheme can be used. To achieve the rating correlation, a neural network 50 is employed, which is found to be a particularly efficient manner of obtaining the correlation.

Figure 4:
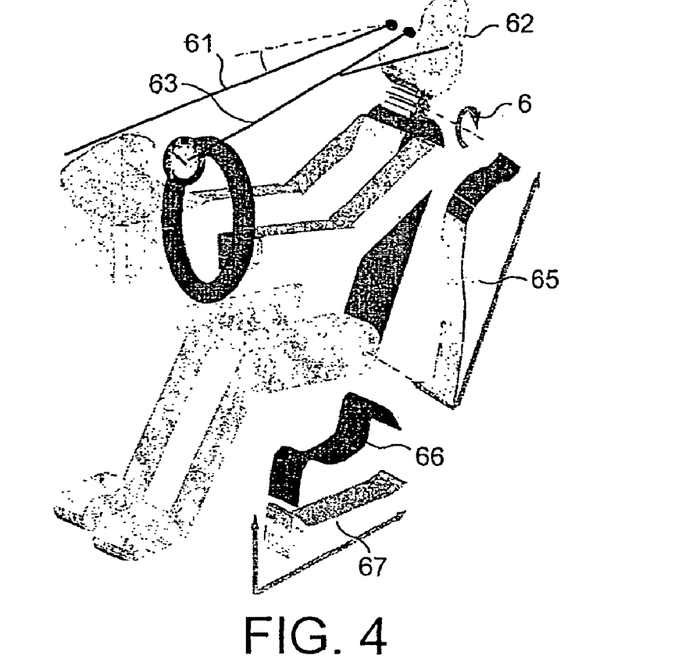
FIG. 4 shows an multi-element human model for AMT shift profiling.

In addition to the vehicle/powertrain inputs, the driver subjectivity can be modelled using a seat model 55 and a multi-element human model generally designated 60 in FIG. 3 and shown in more detail in FIG. 4. This assumes that a metric can be derived which includes pressure profiles acting upon the driver's body, sensitivity transfer functions and time derivatives of the following variables: head pitch 61, vehicle pitch, rpm-visual 63, rpm-acoustic 62, normal forces, shear forces and neuromuscular feedback to maintain seated posture, the latter parameter relating mainly to the neck 64 and arms of the driver. Clearly these measurements are beyond normal data logging techniques, and so the model shown is applied. The parameters and boundary conditions are varied until the model reacts in the same way as a real driver, allowing the model to stand alone. As discussed below a neural network is a particularly suitable system for achieving this objective efficiently.

The relevant parameters are derived from a dynamic model of the driver. The transformation of these variables would include the following:
time derivatives
mean, positive peak, negative peak, number of perceptible oscillations.
sensitivity transfer functions
Dosage metrics associated with Power Spectral Densities (from FFTs)
In addition conventional parameters relate to variables referenced to the seat rail of the vehicle, where appropriate.
Shift time (measured as the time from the initiation of the shift to the time at which full torque has been re-instated).
Pitch: pitch rate and pitch acceleration—treating positive and negative pitch as distinct variables.
Longitudinal Acceleration: mean, positive peak, negative peak, number of perceptible oscillations.
Jerk: mean, positive peak, negative peak, number of perceptible oscillations Related metrics would also be derived as dosage metrics associated with Power Spectral Densities (from FFTs) of vibrations in longitudinal and pitch modes.

The above transformations would be applied to the following variables:
Normal pressure profiles acting upon the driver's body
Shear forces
Head pitch
Trunk pitch about the hip axis (spinal flexure assumed zero in a simple case although more complex models would be considered for the most realistic case.)
Engine speed change: rpm-visual and rpm-acoustic.
The influence of aural cues (SPL distributions) arising from a change in powertrain state (load and speed)
Neuromuscular effort associated with control of neck muscles to maintain posture, the latter parameter relating mainly to the neck and arms of the driver. A control technique, preferably PID would be applied to maintain equilibrium, and a measure associated with the magnitude of the control action would be taken as an approximation of muscular effort.

The raw variables thus obtained are also fed to the parameter definition block 40 after sensitivity weightings are applied as appropriate at block 70. These weightings may be pre-set or themselves learned in the neural network 50. The parameters are fed to the neural network 50, to obtain correlation with the predicted rating.

Accordingly the method applies the following process:
Record data in-vehicle (longitudinal acceleration, pitch, pitch rate) with shift subjective rating.
Repeat for a wide range of shifts with definite attributes to avoid ill-conditioning of the data.
Define functions to describe the pressure profiles for the body/seat contact areas.
Use these pressure profiles to transfer loads to the driver model.
Vary the boundary conditions (profiles) until the simulated driver reacts as in the real vehicle.
Apply neural networks with vehicle measurements as the input layer and subjective ratings as the output layer to establish the correlation metric.

The effectiveness of the technique arises because the greater the number of direct influences included in the model, the more the effect of extraneous influences (such as brand image etc) will be reduced, but not eliminated. It is inevitable that the same gear-shift (objectively identical) will give different subjective rating when assessed in a two different vehicle platforms.

As a result a Correlation Model is provided in the form of the algorithm which has inputs of system parameters (transforms of variables) and outputs a predicted value of shift quality rating. The model can be used in the vehicle development process once the neural network has been trained in a calibration period to ascertain the effects of changes to the vehicle on shift quality and to tailor the design to improve shift quality.

Although a look up table could be used to store the correlation data, or a regression model model adopted, Neural Networks provide a simple and robust mechanism to convert system parameters into a predicted rating involving the following components:
Input layer—the interface for input parameters
Intermediate layers—comprising neurones and weighted links Output layer—the interface for the output value Training environment—application of training data to vary the characteristics of the intermediate layers to mimic the response of the real system.

Furthermore neural networks will account for main effects and multiple interactions. Any appropriate Neural network can be utilised and indeed toolboxes exist which may enable the tools to be applied without expert understanding. Appropriate techniques of linear/non-linear regression may be adopted in addition or alternatively.

It will be appreciated that once the system is trained in a calibration phase using correlations against real subjective shift ratings, further development can be carried out for a specific vehicle or class of vehicles using the model alone. Yet further, the system can be implemented in a vehicle control system of the type shown in FIG. 5.

Figure 5:
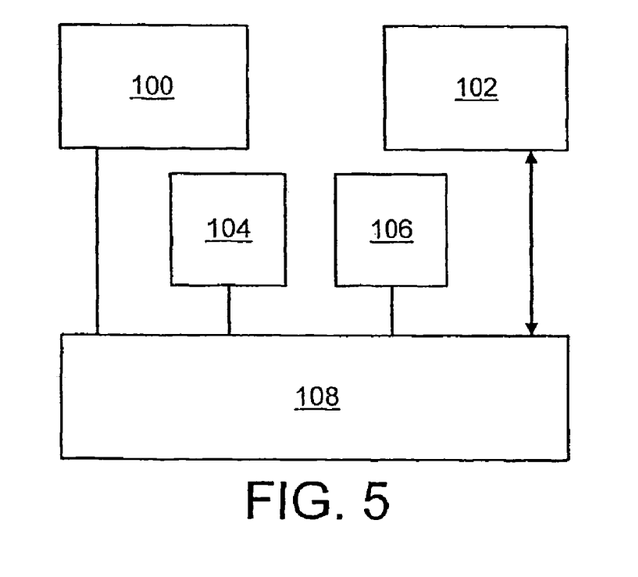
FIG. 5 is a block diagram of a control system according to the invention.

The control system includes a vehicle manoeuvre sensor 100 which detects the manoeuvre parameters (gear change, speed, acceleration) and inputs them to a controller 108, for example implemented in the ECU. The controller derives control parameters from a look-up-table or neural network as obtained in the calibration/development process and feeds the control parameters to the shift control block 102 which controls the shift to provide the desired shift quality.

The controller 108 can further compensate for long term changes in the vehicle, providing diagnostics to trigger maintenance by implementing a control loop with additional sensor/model blocks 104, 106. Block 104 comprises a driver module which can comprise sensors to monitor driver perception (seat rail acceleration for example) and/or a model based on predetermined values derived in the calibration/development stage to assess human model parameters such as neck moment. Block 106 comprises shift parameter sensors (which can alternatively be measured and returned to the control block 108 from the shift parameter block 102) to monitor continuing operation of the vehicle. Based on this feedback the ECU can adjust control parameters over the long term and/or flag up the need for repair or adjustment. In addition to adjusting direct control parameters the ECU can also liaise with other engine components under its control (e.g active suspension) to adjust shift quality.

It will be seen further that, using a trained neural network as a component of the controller block 108, the system can continue to learn about shift quality based on feedback from the driver module 104.

A further possible system providing improved shift quality metrics uses system identification to aid the understanding of transmission shift characteristics and establish dynamic relationships for the vehicle system. Simple techniques for estimating parametric system descriptions given step and impulse response assumptions and data have been applied as a first stage.

Figure 6:
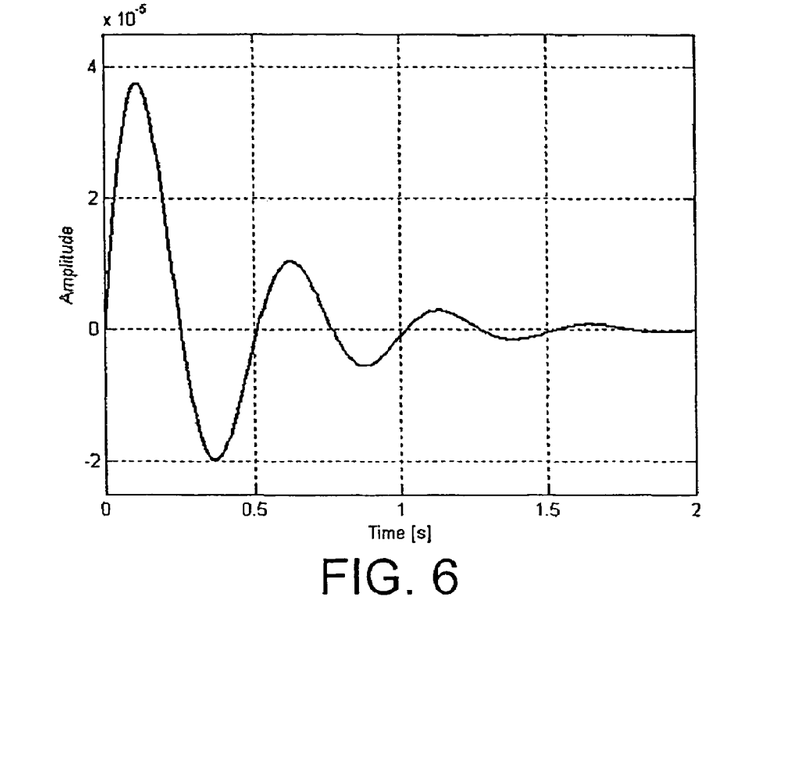
FIG. 6 shows longitudinal acceleration during shift.

The time history for the sprung mass longitudinal acceleration during a transmission shift can be separated into torque disruption, re-application and transient phases, see FIG. 6. Examination of these phases reveals information about the transmission, driveline and vehicle dynamics.

Figure 7:
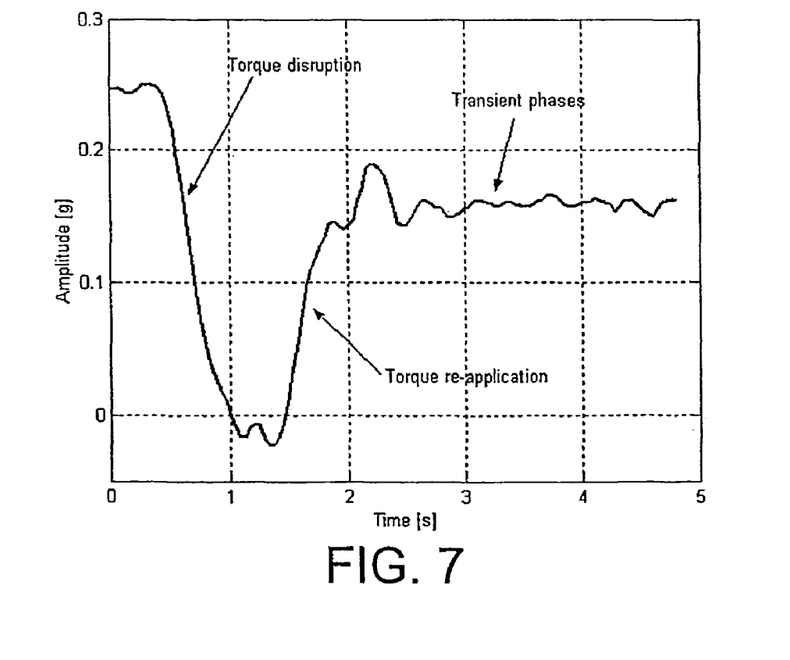
FIG. 7 shows a time history during shift.

To illustrate, FIG. 7 shows a typical time history for the rate of change of longitudinal acceleration proceeding the re-application of torque during a shift. On the assumption that torque will be applied in an approximately step-wise manner, the aforementioned time history corresponds to an impulse response for the vehicle and relates transmission torque input to the longitudinal acceleration of the sprung mass (i.e. the vehicle).

The results shown in FIG. 7 tend to indicate that the dynamic behaviour of the vehicle can be characterised by a third-order system. Moreover, assuming that the principles of superposition can be applied, by inspection it is apparent that the impulse response comprises first and second order components, see FIGS. 8 and 9.

Figure 8:
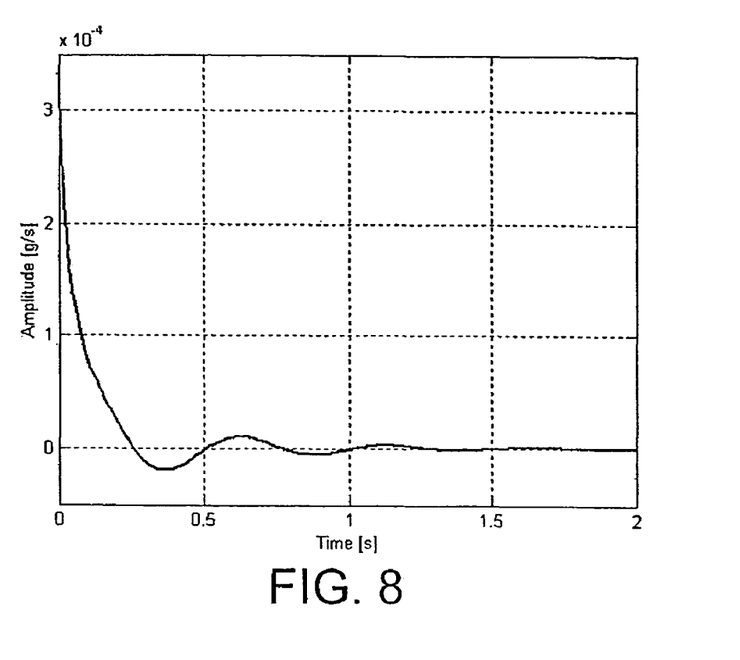
FIG. 8 shows first order components during shift.
Figure 9:
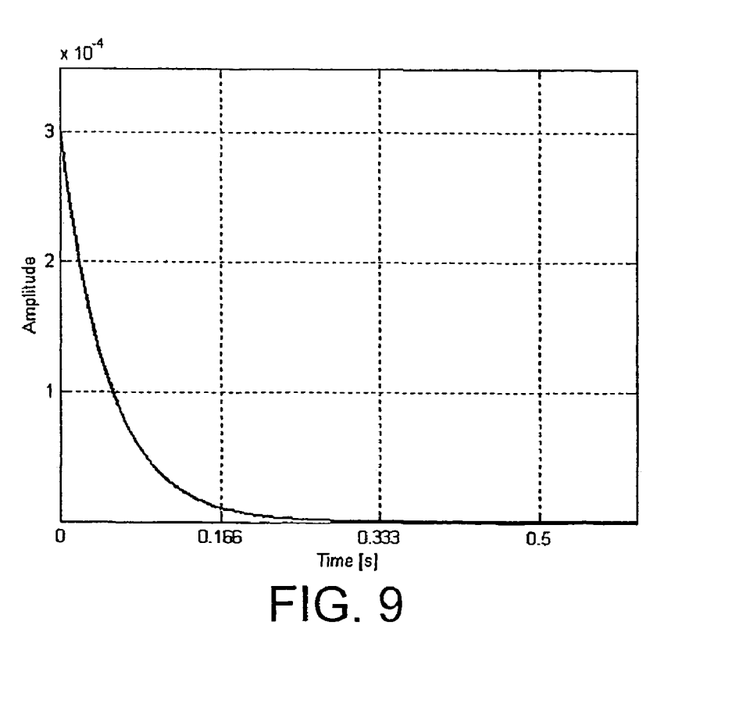
FIG. 9 shows second order components during shift.

By considering the above-mentioned first and second order components of the impulse response, engineering insight can be gained about shift quality and the vehicle. For example, the first order component gives an indication of the shift time constant and statistical measures of power loss during shifts; the second order component can be used to estimate the natural frequency and damping ratio of the driveline (i.e. parameters associated with the shunt phenomenon).

It will be seen that the methodology as described above can be applied in various instances. First of all they can be used for the collection of objective and subjective data which in itself can form basis for useful analysis as well as the foundation for automating the subjective rating process. Off-line simulation, normally undertaken for the development of mechanical and control elements relating to powertrain, drive-line and vehicle systems can be extended according to the invention. In particular the trained neural network or other selective means of correlation between objective and subjective data allows the predictions likely objective assessment of the system or relevant part of the system response allowing appropriate design changes to be quickly identified and implemented in the development stage.

Once design parameters have been arrived at in the simulation phase these can be assessed on dynamic test rigs. Such rigs will be fitted with system elements to simulate certain aspects of the system. For example a real transmission can be driven by an electrical dynamometer with the vehicle load applied to the output of the transmission loaded by another dynanometer.

Yet further, as discussed above, sensitivity studies can be undertaken to establish the relevant effect and interaction between system changes due to wear and degradation during the life of the vehicle. This can be in simulation which will be more straightforward for reasons of practicality but can also be in actual operation of the vehicle as indicated above. The information derived can be applied for two main purposes. First of all the information would be used to guide systems designed to achieve the minimum desired shift quality performance in the most efficient way in terms of weight/cost/package envelope and so forth. This can be based on the system specification for the vehicle, and taken into account controllable chassis devices and powertrain devices for example. As a result a tolerance can be built in to accommodate likely system degradation. Secondly the derived information can be used as stored information to guide the control systems of the vehicle to adapt control parameters to maintain shift quality during the life of the vehicle as mechanical elements of the chassis and powertrain degrade. In other words dynamic adaptation can be applied as an alternative to introducing tolerances ab initio.

It will be appreciated that the invention can be applied to any appropriate AMT scheme, and used to calibrate and develop vehicles and vehicle transmissions, based on a shift profile appropriate to the vehicle or market (eg smooth or sporty profiles as appropriate). The invention extends not only to the features specified in the claims that follow but to any other novel feature, method or technique or combination disclosed herein.

The invention claimed is:

1. A vehicle powertrain modeling system for modeling the performance of a vehicle during a gear shift, the system comprising:

(a) a transmission shift parameter model element representing powertrain factors affecting shift quality;

(b) a vehicle model element representing the dynamics/physical characteristics of the vehicle under consideration;

(c) a driver parameter model element representing driver subjectivity during a particular gear shift, wherein a PID control technique is used to derive a metric associated with the neuromuscular feedback required by the driver to maintain seated posture during a particular gear shift; and (d) a correlation element to correlate data from said model elements with ratings of gear shift quality, wherein gear shift quality is the performance of the vehicle during a gear shift as perceived by the driver of the vehicle.

2. A system as claimed in claim 1 in which the correlation element comprises a neural network.

3. A system as claimed in claim 1 in which the transmission shift parameter model element comprises as parameters at least one of engine torque, engine speed, control of clutch(es), control of transmission engagement actuators, control of active dampers to control chassis pitch, control of active driver seat ergonomics.

4. A system as claimed in claim 1 in which the driver parameter model element comprises as parameters at least one of shift time, pitch, longitudinal acceleration or jerk at the seat rail and/or pressure acting on the driver's body, shear forces, head pitch, trunk pitch about the hip axis, engine speed change, aural cues or neuromuscular effort at the neck.

5. A system as claimed in claim 1 further comprising a vehicle maneuver element, defined in terms of at least one of vehicle speed, vehicle acceleration, and specified transmission shift.

6. A system as claimed in claim 1 in which the vehicle transmission is a stepped ratio transmission.

7. The system of claim 6, wherein the stepped ratio transmission is an AMT transmission.

8. The system of claim 1, wherein the system is configured for measuring or modeling the forces experienced by the driver during a gear shift, and to output a rating for the quality of said gear shift in relation to an ideal or desired force profile for said driver during said gear shift.

9. A method of modeling a vehicle transmission comprising the steps of designating a vehicle maneuver including a particular gear shift, vehicle speed and longitudinal acceleration, modeling associated transmission shift parameters, modeling associated driver parameters, and correlating the modeled parameters with ratings of gear shift quality, wherein the gear shift quality is the performance of the vehicle during a gear shift as perceived by the driver of the vehicle, the method including an assessment of driver subjectivity during a particular gear shift using a PID control technique to derive a metric associated with the neuromuscular feedback required by a driver to maintain seated posture during a particular gear shift.

10. The method of claim 9, wherein the correlating the modeled parameters further comprises measuring or modeling the forces experienced by the driver during a gear shift, and outputting a rating for the quality of said gear shift in relation to an ideal or desired force profile for said driver during said gear shift.

11. A system for modeling vehicle driver subjectivity during a particular gear shift, the system comprising a PID controller for deriving a metric associated with the neuromuscular feedback required by the driver to maintain seated posture during a particular gear shift as part of an assessment of gear shift quality, wherein gear shift quality is the performance of the vehicle during a gear shift as perceived by the driver of the vehicle.

* * * * *

UNITED STATES PATENT AND TRADEMARK OFFICE
CERTIFICATE OF CORRECTION

PATENT NO. : 7,390,284 B2 Page 1 of 1
APPLICATION NO. : 10/477245
DATED : June 24, 2008
INVENTOR(S) : Jonathan Charles Wheals It is certified that error appears in the above-identified patent and that said Letters Patent is hereby corrected as shown below:

In the Claims:

In Claim 1, column 7, line 13, the word "elements", should be --element--.

Signed and Sealed this

Seventh Day of October, 2008

JON W. DUDAS
*Director of the United States Patent and Trademark Office*